April 8, 1958     E. A. BULLOCK ET AL     2,829,889
MAGAZINE FOR RETAINING CONTINUOUS FILM FOR PROJECTOR
Filed Sept. 21, 1954     3 Sheets-Sheet 1
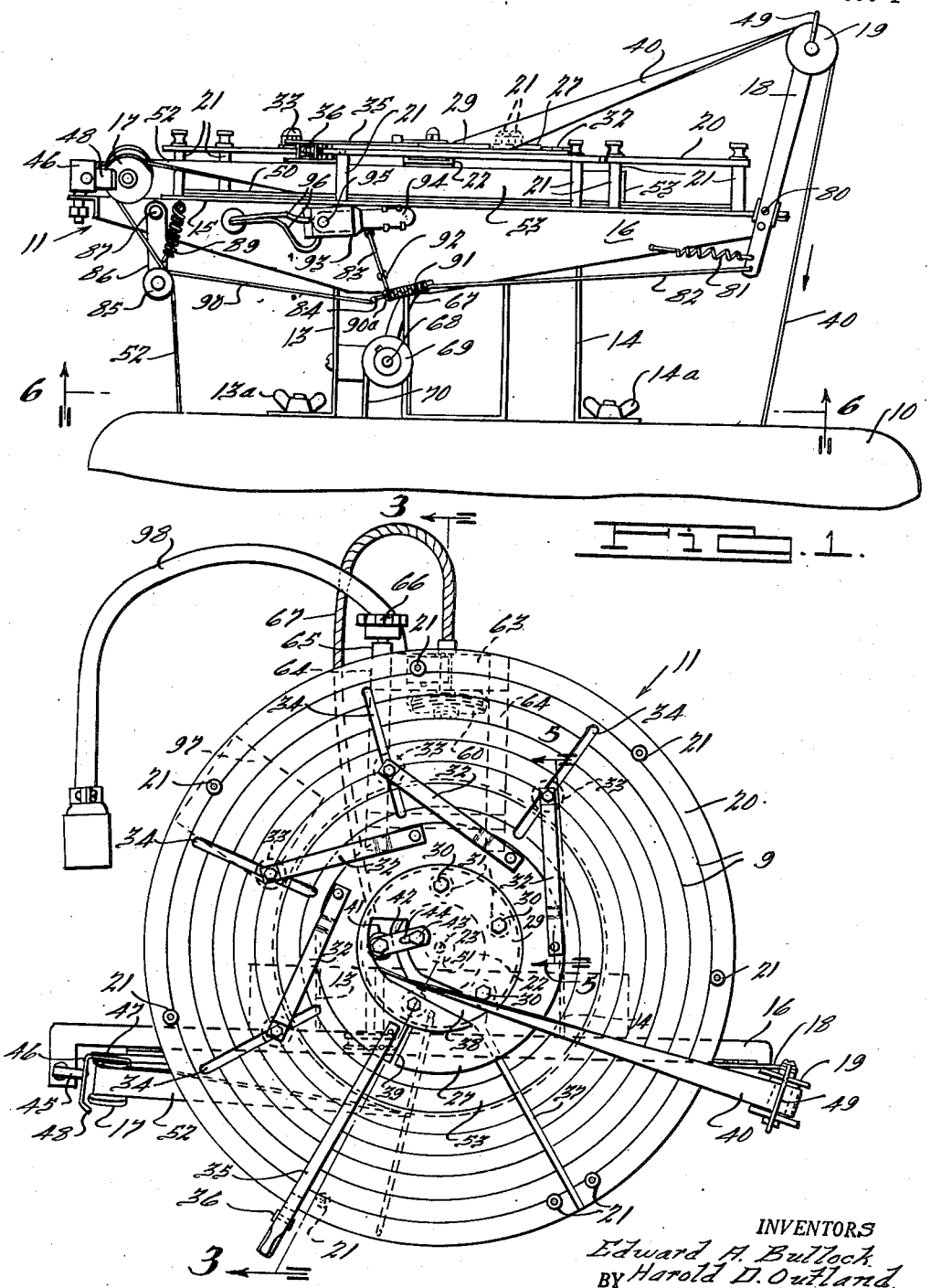
INVENTORS
Edward A. Bullock
Harold D. Outland
BY Harness, Dickey & Pierce
ATTORNEYS April 8, 1958   E. A. BULLOCK ET AL   2,829,889
MAGAZINE FOR RETAINING CONTINUOUS FILM FOR PROJECTOR
Filed Sept. 21, 1954   3 Sheets-Sheet 2

INVENTORS
Edward A. Bullock
BY Harold D. Outland

Harness, Dickey & Pierce
ATTORNEYS

April 8, 1958  E. A. BULLOCK ET AL  2,829,889
MAGAZINE FOR RETAINING CONTINUOUS FILM FOR PROJECTOR
Filed Sept. 21, 1954                    3 Sheets-Sheet 3

INVENTORS.
Edward A. Bullock.
BY Harold D. Outland.

Harness, Dickey & Pierce
ATTORNEYS.

United States Patent Office 2,829,889
Patented Apr. 8, 1958

2,829,889

MAGAZINE FOR RETAINING CONTINUOUS FILM FOR PROJECTOR

Edward A. Bullock, Detroit, and Harold D. Outland, St. Clair Shores, Mich., assignors to Technical Service Incorporated, Livonia Township, Mich., a corporation of Michigan Application September 21, 1954, Serial No. 457,472

8 Claims. (Cl. 271—2.15)

The present invention relates to the projection of moving picture film. More specifically, the invention relates to a film magazine of the continuous type which permits continuous running of a film without pause for rewinding.

For commercial projection or for educational and industrial use, moving picture film frequently has to be run and rerun for successive audiences without time for rewinding of the film. This is accomplished by joining the ends of the film and winding the continuous loop of film on a spool or magazine so that film is fed off either the inside or outside of the spool while being continuously rewound on the opposite side. There have been many continuous magazines designed for this purpose. They have not been satisfactory, however, for a number of reasons. One of the most important of these is that the film tends to rewind improperly due to poorly designed film centering devices. When improperly centered the film builds up unevenly causing uneven feed, vibration, and binding and film breakage. Another cause of difficulty has been inadequate film safety devices to prevent film breakage. Still another important disadvantage of many continuous film magazines is that they are not entirely self-contained and as a result are not easily installed on existing motion picture projectors without modification of the projector itself.

Accordingly, the main objects of the invention are: to provide a continuous film magazine which is jam-free and which is capable of long periods of use without film breakage; to provide a continuous film magazine which is self-contained and easily installed on moving picture projectors not already equipped for continuous projection; to provide a continuous film magazine for moving picture projectors which incorporates improved film centering devices to eliminate improper film build-up and consequent jamming and film breakage; to provide a continuous film magazine which incorporates a safety device sensitive to variations in film tension and which will stop the projector at the first sign of improper operation; to provide a continuous film magazine which is more compact and which need not be disassembled for storage in the projector carrying case; to provide a continuous film projector which can be operated on a case-enclosed projector without unsightly projecting reels and the like; and, in general, to provide a continuous film magazine which is simple, rugged and trouble-free in operation.

Other objects and features of novelty of the invention will be specifically pointed out or will become apparent in the description to follow when taken in conjunction with the accompanying drawings, wherein:

Fig. 1 is a side elevational view of the continuous film magazine of this invention;

Fig. 2 is a plan view of the film magazine shown in Fig. 1;

Figure 3:
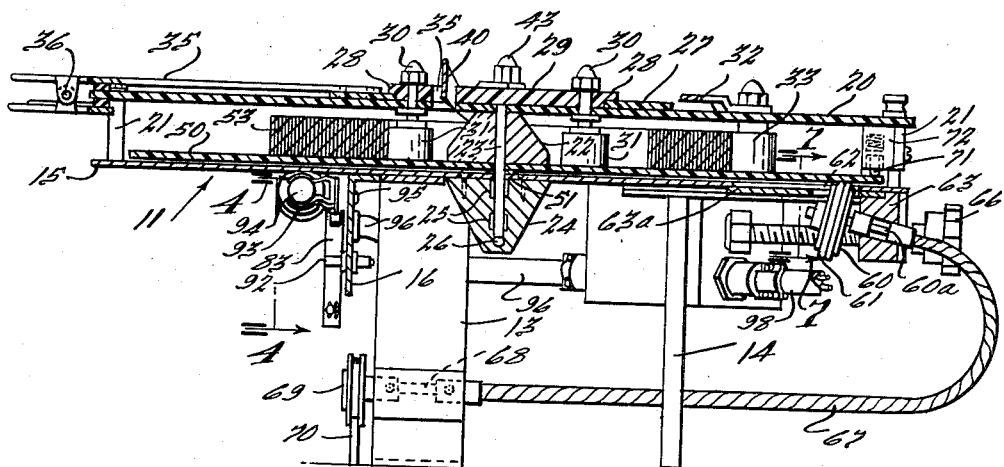
Fig. 3 is a sectional elevation of the film magazine shown in Figs. 1 and 2, the section being taken along the line 3—3 of Fig. 2.
Figure 6:
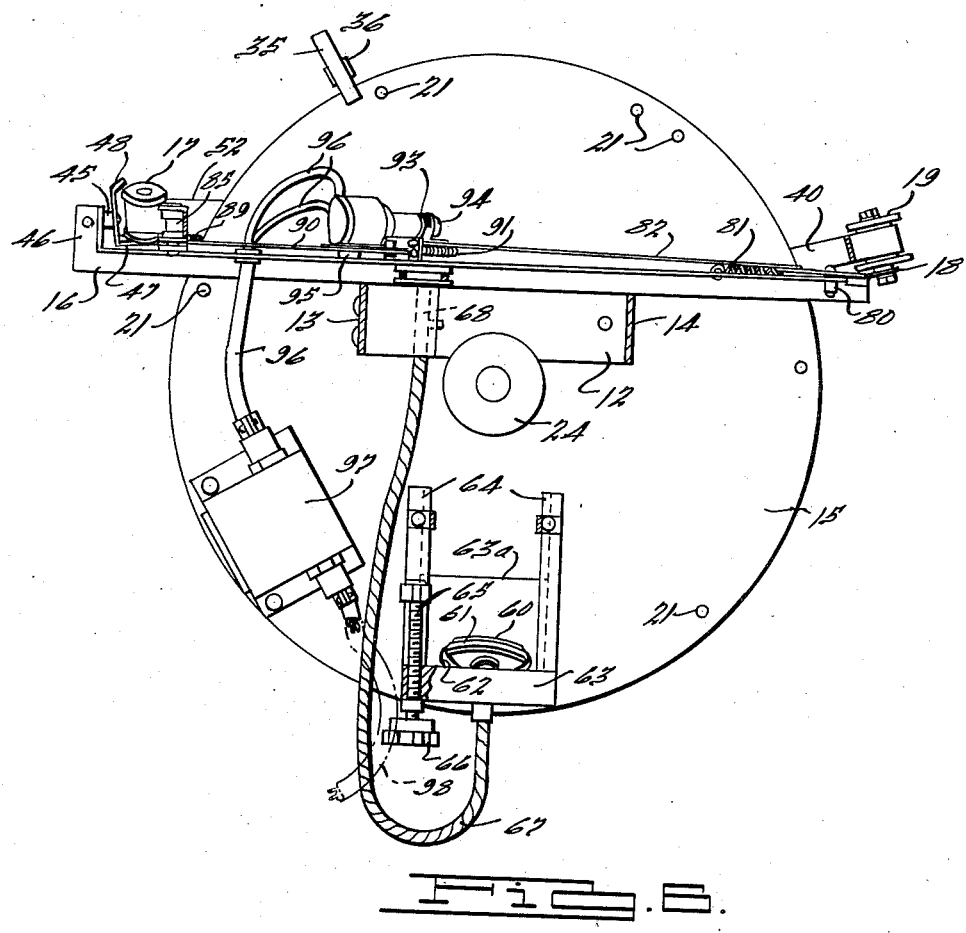
Fig. 6 is a bottom view, partially in section, of the film magazine of this invention, the section being taken along the line 6—6 of Fig. 1.
Figure 7:
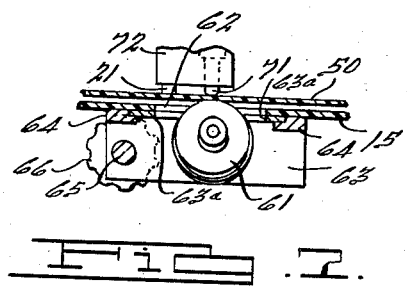
Fig. 7 is a fragmentary end view in section showing a portion of the drive mechanism, the section being taken along the line 7—7 of Fig. 3.

In Fig. 1, a conventional moving picture projector 10 is provided at the top with a continuous film magazine of this invention. The magazine, indicated generally by the arrow 11, is mounted on top of the projector 10 by means of a base bracket 12 (Fig. 6) which is composed of a left-hand leg 13 and a free-standing bracket-type right-hand leg 14, the legs 13, 14 being joined at the top to form the base bracket 12. Two wingnuts 13a, 14a are the only fastening devices required to secure the base bracket 12 and magazine 11 to the top of the projector 10. Attached to the top of the base bracket 12 is a stationary circular plate 15 (Fig. 3) and to the front faces of the legs 12, 13 a light-weight beam support 16 on which is mounted a film input pulley 17 and an upwardly-extending pivoted arm 18, the latter having a film feed-off pulley 19 mounted on its upper end.

The input pulley 17 is mounted on a universal mounting so as to pivot slightly in response to the action of film moving over it. This mounting comprises a short arm 45 attached to the projecting end of beam 16, the arm 45 being bent at right angles to pass downwardly through the beam, and an open-ended clip-type bracket 46 pivotably mounted on the end of arm 45. The pulley 17 is mounted on one leg 47 of bracket 46, the other leg 48 being open and projecting slightly outwardly beyond the pulley to guide a film loop over pulley 17. The output pulley 19 is rigidly mounted for rotation on arm 18 and is provided with an overlying film retainer loop 49.

Attached atop the stationary bottom plate 15 is a stationary upper cover plate 20. The upper plate 20 may be made of a plastic or other transparent material in order to permit visual inspection of the film windings in the magazine.

The upper plate 20 is secured to and supported on the lower plate 15 by a series of outer studs and spacers 21 and by a central cone support 22 through which a shaft 23 is passed. The shaft 23 extends down into a lower conical bearing support 24 secured by screws to the underside of bottom plate 15. The bearing support 24 holds several small roller-type bearings 25 and a ball-type end-thrust bearing 26. A rotatable annular collar or washer 27 is held in place on top of upper plate 20 under the lip 28 of a stationary center hub piece 29. The center hub piece 29 is secured to the top plate 20 by means of nuts 30 on the pin-like projections on top of five inner rollers 31. The inner rollers 31, 31 are located equidistant from the rotational center of the magazine and are circumferentially disposed so as to form an inner film take-off area. The collar 27 is freely movable relative to hub 29. Loosely riveted to collar 27 are a number of tangentially-disposed arms 32, 32 which have their other ends secured to pins attached to a number or movable outer rollers 33, the pins being disposed in radial slots 34 located in top plate 20. The arms 32 are proportioned and circumferentially-located on collar 27 so as to position each of rollers 33 at equal distances from the rotational center of the magazine to define an annular film wind-up area with the inner rollers 31. Also riveted to collar 27 is a handle 35 having a spring-operated pinch fastener 36 on its outer end, the fastener 36 being adapted to grip the outer edge of top plate 20 for positioning of the lever. When handle 35 is moved back and forth a short distance along the outer edge of upper plate 20, the collar 27 will move the rollers 33 radially in their slots, always equidistant from the rotational center. The movable outer rollers 33, 33 are a part of the centering device for correcting the position of the outer film windings. Concentric circles 9 on the plate 20 inform the operator whether the amount of film is accurately centered within the magazine.

Top plate 20 has a radial slot 37 extending all the way into the center hub 29 and connecting with a curved film take-off slot 38 therein. Collar 27 likewise has a slot 39 which can be aligned with slots 37 and 38 in order to provide a pathway for threading of the film take-off loop 40 into and out of the magazine. Disposed in the film take-off slot 38 is a conically tapered roller 41 adapted to smoothly curve and guide the take-off film loop 40. The latter take-off roller 41 is adjustable a small distance back and forth across the width of take-off slot 38 by virtue of having its upper end secured to a short slotted arm 42, the latter being secured to center hub 29 by a stud 43 located in a slot 44. Minor inward and outward adjustment of the tapered take-off roller 41 can be effected to compensate for the number and initial positioning of film windings on the magazine and for differences in film stiffness, thickness and the like. Once the magazine is loaded, however, further adjustment of take-off roller 41 is usually unnecessary.

Located between plates 15, 20 is a rotatable plate 50 which is positioned on shaft 23 above plate 15 by a small spacer or washer 51. The inner rollers 31, 31, of course, terminate just above or rest very lightly on rotatable plate 50 so as to prevent slipping under the rollers 31, 31 of a loop of film. So mounted, the plate 50 is very nearly friction-free and is held in alignment by the wide bearing edges of the center cone 22.

The film is wound up on rotatable plate 50 when the latter is driven, as will be described below. The film input loop 52 enters the magazine from the left, passes between plates 15 and 20 and is wound up on the outside of the accumulated film windings 53 already in place on plate 50. The outer rollers 33, 33, insure even, tight and perfectly centered winding of incoming film. If the windings 53 are malpositioned in some manner, back-and-forth rotation of handle 35 to cause the rollers 33, 33 to exert increased pressure on the windings produces a smoothing action in which the windings 53 are easily moved and recentered on plate 50. The handle 35 is left in a position in which the rollers are in contact with the outer film winding. As projection is continued, additional windings applied cause the rollers 33, 33 to exert a gentle inward pressure on the accumulated windings. This continuously and smoothly moves the entire film supply toward the center of plate 50.

The film output loop 40 is taken out of the magazine from the right, as viewed in Figs. 1 and 2, through the central take-off area adjacent to the outer side of rollers 31, the loop 40 passing and curving smoothly over the tapered take-off roller 41 and out through take-off slot 38. The loop 40 then passes downwardly over pulley 19 in the directaion of the arrows, to the projector shutter housing where it is threaded over sprockets in the conventional manner. From the usual projector take-off sprockets, the input loop 52 passes vertically over pulley 17 and back into the magazine.

Magazine drive

A variable speed adjustment is provided for the magazine which is desirable as some films are run much more loosely if driven at a slightly higher speed than other film. This is due primarily to the fact that as the film becomes dirty the surface is not as slick, and consequently, the layers of film in the roll do not slide by each other as readily as clean film. The plate 50 is driven by a friction drive wheel 60 having a tire or center bead 61 of a resilient high-friction material such as rubber. The wheel 60 is mounted on the underside of stationary bottom plate 15 near the outer edge thereof, the edge of wheel 60 passing through an elongated slot 62 in plate 15 to make contact with the underside of rotatable plate 50. The wheel 60 is mounted at a slightly upwardly inclined angle in a slidable bearing block 63 which is secured at its top to a slide element 63a which fits into undercut grooves in a pair of parallel slides 64, 64 secured to the underside of lower plate 15. A screw 65 is threaded through block 63 to vary the location of wheel 60 within the limits of the slides 64. This is accomplished by turning the knob 66 attached to screw 65. When the position of wheel 60 is moved radially of the plate 50 between the slides 64, a variation in the speed of rotation of the plate will be effected. In this manner, the rotational speed of plate 50 may be varied independently of the speed of the projector and its pulley system. The wheel 60 is connected by means of a short shaft 60a to a flexible drive shaft 67 which in turn is connected to a short shaft 68 journaled in the left-hand base leg 13. Attached to the other end of shaft 68 is a pulley 69 over which a belt or flexible spring 70 is placed. The belt 70 is connected on its lower end (not visible) to a driven pulley of the projector 10.

The pressure exerted on rotatable plate 50 by the friction drive wheel 60 is taken up by ball thrust bearing 71 which is journaled in a block 72 attached to one of the outer spacer elements 21. The bearing 71 thus prevents upward displacement of the rotatable plate 50 when the friction drive wheel is urged against its underside. This mounting arrangement exerts very little frictional drag on plate 50.

Safety switch

Figure 4:
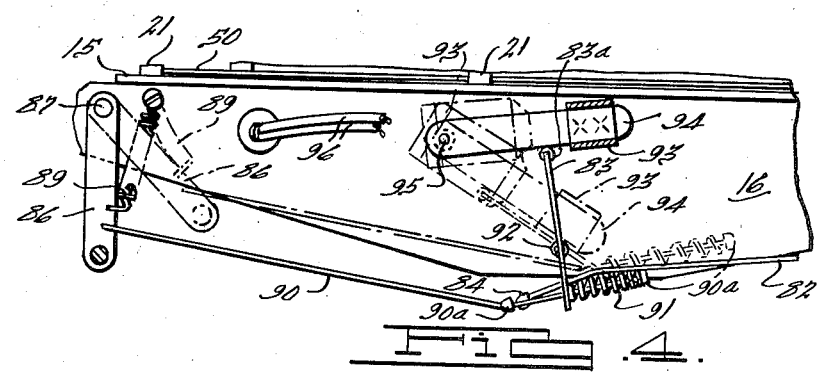
Fig. 4 is an enlarged fragmentary view of the film magazine of Figs. 1–3, the portion enlarged being indicated between the arrows 4—4 of Fig. 3.
Figure 5:
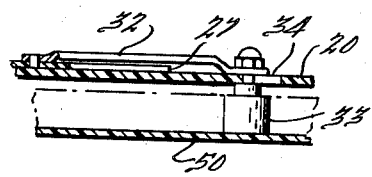
Fig. 5 is a fragmentary sectional view showing the disposition of one of the outer rollers of the film-centering device, the section being taken along the line 5—5 of Fig. 2.

The magazine 11 is provided with a tension-sensitive safety switch to guard against film damage or breakage. As will appear in Fig. 1, the take-off pulley arm 18 is pivoted on a pin 80 located in the right-hand end of beam 16. The lower end of arm 18 is held in a near vertical position by a tension spring element 81 attached to beam 16. A slender rod or stiff wire element 82 is also pivotally secured in the end of arm 18 below the spring 81. The rod 82 extends longitudinally of the beam 16 and is curved slightly downwardly at its end where it passes through a vertical, pivotable lever 83. On the end projecting through lever 83 a knob 84 is provided to prevent disengagement. At the left-hand end of beam 16 a small tensioning idler pulley 85 makes contact with input film loop 52, the pulley 85 being secured to a short arm 86 which is pivotally secured to beam 16 by a pin 87. The arm 86 will be biased outwardly by any increase in tension in the loop 52. To maintain a constant tension on film loop 52, the arm 86 is connected to beam 16 by a tension spring 89. Also attached to arm 86 is a second rodlike element 90 which extends longitudinally of the beam 16 and passes through the pivotable upright lever 83, the end of element 90 being bent slightly upward and extended through the lever 83. A knob 90a forms a stop which engages lever 83 during right-hand movement of rod 90. A compression spring 91 is placed on the length of element 90 projecting beyond the lever 83. The functions of the spring 91 are to permit some movement of rod 90 independently of rod 82 and to return the lever 83 to position. As shown in Figure 4, both of the rods 82, 90 extend beyond the lever 83 in order to permit slight normal operating movement in the pulleys 19, 85 without corresponding movement of lever 83. The lever 83, however, is operated to the off position by the rods 82, 90 moving in the same direction, the former pulling and the latter pushing.

The lever 83 is pivotally attached, at a point intermediate its length, to beam 16 by a rotatable pin 92. On its upper end, lever 83 carries a smaller roller 83a which is in rolling contact with the edge of a clip bracket 93 into which is clipped a conventional make-or-break mercury switch 94 or other electrical switch. The bracket 93 also is pivotally attached at its left-hand end to the beam 16 by means of a pin 95. With this arrangement, the amount of tension normally applied to the film loops 40 and 52 is largely determined by the design of springs 81 and 89. When this normal operating tension is exceeded by improper winding of film inside the magazine, by crimped film, or some other cause, the spring-loaded pulley 19 will be displaced to the left, as viewed in Fig. 1. This displacement will be transmitted through rod 82 to the lever 83 and will cause the latter to pivot about pin 92. This will lower the free end of switch 94 and cause the circuit to be broken. The switch 94 is connected through wires 96, 96 to a junction box 97 located on the underside of plate 15. From the junction box 97 a wire plug-in cable 98 leads to the usual plug-in socket of the projector in order to complete the motor circuit through switch 94. However, if the input film loop 52 should break, projection will continue until the film disengages pulley 85, the rod 90 biased to the right by spring 89, and the lever 83 pivoted by contact of knob 90a therewith. This also operates switch 94 and stops the projector motor.

Should improper wind-up of film input loop 52 occur due to poor centering, the result will be variable tension in output loop 40 which will cause lever 83 to move to the right to shut off the projector motor. Furthermore, unless the tension in both the input and output film loops is correctly adjusted, the rods 82, 90 will be drawn out of position and the projector motor will not start, indicating to the operator at the outset that adjustment is necessary.

Thus provided, it is easily seen that the likelihood of damage, such as creasing or folding or breakage of the film is very slight. The tension-sensitive safety switch will shut off the projector before this can occur and before any substantial amount of improperly wound film accumulates in the magazine. The length of lever 83, its mounting on the beam 16, and the strength of springs 81, 89 and 91 can be varied to obtain any desired operating tension in the film.

In the film magazine of this invention, the double centering device formed by the inner and outer rollers, together with the film positioning made possible by the slot-mounted, slidable outer rollers make it possible for an operator to position the film before starting the projector and to make minor corrections shortly after starting. Once the film windings are properly centered on the rotatable plate 50 in the annular film wind-up space between the inner and outer rollers, the magazine will operate smoothly without further attention. The outer rollers exert a gentle inward pressure as the outer film windings accumulate. The removal of windings from the center of the film pack progressively takes up the slack in the windings caused by inward movement of the windings. Thus, the film windings rotate to a certain extent on plate 50 independently of the movement of the latter while simultaneously moving radially thereon.

The speed of the plate 50 can be matched to that of any fixed-speed projector or can be readjusted to correspond to any projection speed of a variable speed projector. This is accomplished by turning knob 66 to move the friction drive wheel 60 inwardly or outwardly in slot 62. Thus, the speed of rotation of plate 50 can be varied over a range sufficiently large to match the speed range of any projector. The actual speed of rotation of wheel 60 itself is directly proportional to the rotational speed of the projector motor since the former is directly connected to the latter through pulley 69 and belt 70. Thus, the movement of wheel 60 permitted by its mounting in the usual case serves to compensate for ordinary belt slippage, for variations in the positioning and in the amount of film being carried in the magazine itself and for wear in the frictionally-engaged surface of the wheel and plate. Once the magazine and its film load is matched to the projector, however, further adjustment in the driven speed of plate 50 is usually unnecessary. With the magazine of this invention, a film may be projected continuously without rewinding and without the minor troubles that are usually encountered with known magazines.

The compact design of the magazine enables its use on permanently-enclosed package-type projectors. In most cases, it is not necessary to remove the magazine when storing the projector in its case. Moreover, the magazine is quickly and simply installed on a projector merely by attaching the two wingnuts, slipping a belt or flexible spring of the correct length over one of the projector-driven pulleys, and plugging the switch cable into the projector power supply plug. Threading of film from the magazine is a very simple operation with the easily aligned slots and tapered guide roller. Once installed and properly adjusted, a film may be continuously projected for long periods, and the projector will always be ready to operate at a flick of a switch.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims. For instance, it is within the scope of the invention to employ sound tape in place of the film to have the sound record repeated without rewinding, as would otherwise be necessary.

What is claimed is:

1. In a magazine for the projection of a continuous loop of film, the improvement which comprises a rotatable film wind-up plate, two sets of concentrically-arranged film-guiding rollers associated with said plate so as to define an annular film wind-up space thereon, means for applying film inside said outer set of rollers, means for withdrawing film inside said inner set of rollers, a central rotatable element and links connected to said outer set of rollers and to said central element for simultaneously moving said outer set of rollers radially on said plate to effect a centering action on film located in said annular wind-up space between said rollers when the central element is rotatably adjusted.

2. A magazine as recited in claim 1 including means to rotatably position said element independently of said wind-up plate.

3. A magazine for the projection of moving picture film comprising a stationary plate having a hub portion disposed opposite a rotatable wind-up plate and having two sets of rollers disposed about the center of said wind-up plate so as to define an annular film wind-up chamber therewith, a rotatable collar associated with said stationary plate, said hub portion having a curved film take-off slot communicating with the inside of said annular wind-up chamber, said stationary plate having a slot positioned radially with respect to said annular wind-up chamber, and said rotatable collar having a slot which may be aligned with said curved slot and said radial slot for insertion and removal of film from said annular wind-up chamber.

4. A magazine comprising a pair of stationary plates, a rotatable film wind-up plate located between said stationary plates, a plurality of rollers mounted on fixed axes and located between said stationary plates and disposed at equal distances about the rotational center of said wind-up plate, a plurality of rollers located between said stationary plates outside said fixed rollers, and movable radially of said wind-up plate, means for applying film inside said movable outer rollers, means for removing film from inside said inner fixed rollers, and means for maintaining the loops of the film accurately centered relative to the rotational center by the simultaneous adjustment of said movable outer rollers.

5. In a magazine for moving picture film driven by the motor of a projector when mounted thereon, the improvement which comprises a pair of pivotally mounted arms, a film-guiding device on each said arm, one of said arms and its film-guiding device being arranged to guide film into said magazine and the other of said arms and its film-guiding device being arranged to guide film being taken out of said magazine and both said arms being arranged to pivot in response to tension in said film, and a switch connected to said arms and actuated by either of said arms for shutting off the projector motor when abnormal tension conditions exist in the input and take-off loops of said film.

6. In a horizontal magazine for the projection of a continuous loop of moving picture film, the improvement which comprises a pair of pivotally mounted arms, a pulley on each said arm, one of said arms and its pulley being arranged to guide said film loop into said magazine and the other of said arms and its pulley being arranged to guide film out of said magazine, spring loading means connected to each said arm to apply tension to said film and permit movement of each said arm in response to abnormal tension in said film, and a switch connected between said arms and actuated by either arm for shutting off the motor of the projector when abnormal tension conditions occur in said loop in said magazine.

7. In a magazine for supporting a continuous strip of material, embodying fixed spaced top and bottom plates, at least one of said plates being made of transparent material and having concentric circles relative to the center mark thereon, a rotatable plate between said spaced plates adjacent to said bottom plate, inner and outer sets of centering rollers supported on said top plate and defining an annular wind-up spaced about the rotational center of said magazine, and means for adjusting said outer rollers radially on said top plate for centering said coil of strip material gauged by said concentric circles.

8. In a magazine for supporting a continuous strip of material, embodying fixed spaced top and bottom plates, at least one of said plates being made of transparent material and having concentric circles relative to the center mark thereon, a rotatable plate between said spaced plates adjacent to said bottom plate, inner and outer sets of centering rollers supported on said top plate and defining an annular wind-up spaced about the rotational center of said magazine, means for adjusting said outer rollers radially on said top plate for centering said coil of strip material gauged by said concentric circles, constant driving means for rotating said magazine, and means for adjusting the speed of rotation of said magazine without changing the speed of said driving means.

References Cited in the file of this patent

UNITED STATES PATENTS

| | | |
|---|---|---|
| 1,132,369 | Lytton | Mar. 16, 1915 |
| 1,479,333 | Stephenson | Jan. 1, 1924 |
| 1,713,939 | Wingren | May 21, 1929 |
| 2,290,447 | Price | July 21, 1942 |
| 2,332,717 | Heyer | Oct. 26, 1943 |
| 2,363,403 | De Napoli | Nov. 21, 1944 |
| 2,436,032 | Bendfelt | Feb. 17, 1948 |
| 2,657,047 | Eddy | Oct. 27, 1953 |
| 2,661,210 | Yeats | Dec. 1, 1953 |